United States Patent Office 3,037,896
Patented June 5, 1962

3,037,896
MASKING PROCESS

Wayne M. Gauntt, Los Angeles, and Robert F. Robins, Pomona, Calif., assignors to General Dynamics Corporation, San Diego, Calif., a corporation of Delaware
No Drawing. Filed Sept. 2, 1959, Ser. No. 837,603
8 Claims. (Cl. 156—13)

This invention relates to a masking process and more particularly to a masking process for masking parts in preparation for chemical milling.

Chemical milling is a manufacturing process of controlled corrosion or selective etching of portions of a metal part or object in an etching solution. Chemical erosion of metals to a predetermined depth in specified areas is used to obtain higher strength to weight ratios and to provide desired contours difficult to achieve by conventional machining methods. In the conventional process a suitable chemical resistant material or maskant is applied to selected areas which are not to be etched and then the part is subjected to the corrosion or etching action of the corroding medium. After exposure to the etchant to reduce the part to the desired thickness, the part is removed from the etching solution. The etched areas are usually covered with a loose black smut film which is removed by dipping the part into a desmutting solution. Thereafter the maskant is removed from the part, usually by placing the part in a conventional vapor degreaser, a tank of solvent, or the maskant can be manually peeled or stripped from the part.

A typical masking operation involves applying one or more coats of maskant by spraying, dipping or flow-coating a liquid type of masking material onto the part and drying or curing. Thereafter, with the use of a template, the maskant is scribed with a knife and portions of the maskant are removed to expose portions of the part to the etchant bath. After etching, the rest of the maskant is removed. This method of masking has many inherent defects and limitations which seriously affect the quality as well as the production rate. For example, among the inherent defects of the process is poor scribe line definition resulting from human error in scribing. Another inherent defect is the variation in adhesion of the maskant which also results in poor scribe line definition. These liquid-type masking materials after drying and/or baking are soft and easily damaged in the normal handling operation. Any slight damage to the maskant that isn't repaired prior to the chemical milling operation will result in a defective part. Excessive time is required to apply, dry and/or cure the necessary coats of maskant. Additional time and labor is required to add reinforcement to the edges, corners and other critical areas. In a more recent type of etching wherein abrasive particles are suspended in the liquid and the part vibrated to enhance cutting action, this type of masking was not satisfactory.

The masking process comprising the present invention consists of applying a plating resistant coating to the part over areas which are to be etched. Thereafter, the part is plated over the areas which are not to be subsequently etched. Due to the fact that the areas to be etched are coated with a plating resist, the plating is only deposited on the areas that are not to be etched. After the plating operation, the plating resist is removed leaving a part that is plated except where etching is desired. During the etching operation, the plated coating serves as the etching resist or maskant. After etching, the plated coating is removed at the same time that the desmutting operation is performed. Since the plating resistant coating is exposed only to the plating solutions and not exposed to the etching solution, a photographic resist, decals and maksing applied by silk screening may be used. These are faster and more efficiently applied than the older methods. The use of plating as a maskant gives a constant degree of bonding, thereby stabilizing the etch factor (ratio of under-cut to depth of etch). It has been found that in plating, a heavier coating is formed on the edges and corners due to higher current density as contrasted to the thinner coatings of the liquid-type maskants due to film shrinkage on drying. The maskant at these areas may expose the base metal especially at sharp edges or corners and therefor these areas may require additional reinforcement.

It is therefore an object of this invention to provide for a novel and improved method of masking a workpiece for chemical etching by plating instead of applying a liquid or pliable maskant to the workpiece for protection from the chemicals.

Another object is the provision of a novel manner of applying a non-etchable plating to a chemically etchable workpiece before exposure to the chemical etchant.

Another object is the provision of a method of masking a workpiece wherein a liquid or pliable maskant is applied to areas to be etched, the remaining portions of the workpiece are plated with a non-etchable plating and the liquid maskant is removed before exposure of the workpiece to the chemical etchant.

Another object is the provision of an improved masking method which results in sharper definition and a saving of time in masking and demasking.

Other objects will become more apparent as a more detailed description of the invention is made.

In an example of the practice of the instant invention a suitable commercially available liquid masking solution is applied to an aluminum workpiece, using a conventional silk screen method in applying the solution to those areas of the aluminum which it is desired to attack with a chemical etchant. It is to be noted that the term "aluminum" appearing in the specification and claims herein is used in its broad sense to apply both to substantially pure aluminum and to alloys of aluminum well known and commonly used in the art. Ease of applying and removing and immunity to electroplating are the principal characteristics of the plating resist material. Many types of silk screen plating resists have these characteristics. One of the suitable materials for this purpose is made with a vinyl base and is commercially available under the trademark of Wornow's #145–10–L. The exposed part of the workpiece is then given a double zinc immersion treatment in a solution of 70 oz./gal. of caustic soda, 13.4 oz./gal. of zinc oxide and 1½ oz./gal. of Rochelle salts. This zincate solution deposits a thin film of zinc on the aluminum surface. The thickness of the zinc plating deposited by the zincate solution increases with the length of immersion. In this application, the thickness is not definitely known but will probably be less than .001 inch. The length of time that the part is in the zincate solution will be influenced by the part's alloying constituents, if any, temperature of the zincate solution and also the concentration and previous treatment. However, the time will probably be less than two minutes. This initial zinc coating is removed in a 1 to 1 solution of nitric acid and recoated by a second immersion in the zincate solution. After the second zinc film deposit the aluminum surface is ready for copper plating.

The copper plating is applied by conventional electroplating in a manner well known to those skilled in the art. The electroplating bath is preferably a Rochelle cyanide solution consisting of the following:

(1) Between 4 and 6 oz./gal. of copper
(2) Free sodium cyanide .10 to .60 oz./gal.
(3) Sodium carbonate 12 oz./gal. maximum
(4) Rochelle salts 5 to 9 oz./gal.

The pH factor of the solution is also kept to about 10 or 11 on a scale of 14 wherein below 7 denotes an acid condition and above 7 denotes an alkaline condition. It should be noted that the carbonate content of the bath was given as a maximum as it increases during the life of the bath. When the maximum is reached, the carbonate content can be reduced by utilizing any of the standard methods for this purpose. Among these would be the use of lime, barium hydrate, calcium sulphate, etc., to precipitate the carbonate. Practical plating baths cannot be operated at a definite composition because as soon as one part is plated, the bath changes in composition. Therefore, the above range was specified over which satisfactory results have been obtained. However, these ranges are not intended to limit the scope of this invention since it is contemplated that other compositions will be equally successful. For example, with proper adjustments optimum results may be obtained from proprietary zinc immersion processes such as "Alumon" manufactured by the Enthone, Inc., New Haven, Connecticut.

The copper is plated to a thickness sufficient to give complete protection and coverage and will usually be less than .001" thick. The typical Rochelle-cyanide copper plating bath is usually operated at a current density 20 to 50 amperes/square foot although baths of higher copper content operate up to 60 amperes/square foot. The substituting of potassium salts for the sodium salts will also increase the allowable operating current density for a given set of conditions. The higher the current density, the more rapid is the plating. For example, at a current density of 10 amperes/square foot, it requires approximately two hours to deposit .001 inch while at a current density of 30 amperes/square foot it takes only forty minutes. Within limits, the slower the rate of plating, the finer and smoother will be the deposit. For production purposes, therefore, the plating is done at the highest current density that will still give acceptable plate. After electroplating the plating resist is removed in a vapor degreaser or hydrocarbon solvent, leaving exposed those portions of aluminum which are to be subjected to chemical attack.

Chemical milling of aluminum parts may be done in either an acid or an alkaline solution. When the workpiece has been etched to the desired depth it is removed from the etching solution. At this time the etched area will be covered with a black smut film which is composed of the insoluble alloying elements in the aluminum. This smut film is easily removed by dipping the etched area into a 1 to 1 nitric acid solution which simultaneously removes the smut film and copper mask in one operation. If desired the copper may be reclaimed from the nitric acid by boiling or by other reclaiming methods not forming a part of the present invention.

While certain preferred embodiments of the invention have been specifically disclosed, it is understood that the invention is not limited thereto as many variations will be readily apparent to those skilled in the art. For example, immersion plating may be preferable to the use of electrodeposited coatings for the non-etchable masking, and the invention is to be given its broadest possible interpretation within the terms of the following claims.

What we claim is:

1. The method of masking an aluminum workpiece a surface of which is to be exposed to chemical attack to produce an integral structural member, said method comprising the steps of masking those areas of said surface to be subjected to attack with an electroplating resistant material, applying a zinc immersion coating to the exposed areas of said surface and thereafter electroplating same with copper, removing the electroplating resistant material to expose a portion of the said aluminum surface, immersing said surface in a chemical etchant to immediately subject said exposed portion to the eroding action of said etchant, and removing the copper electroplating from the aluminum workpiece.

2. The method of masking an aluminum workpiece to be exposed to chemical attack to produce an integral structural member, said method comprising the steps of masking those areas to be subjected to attack with a metal resistant to copper plating, applying to the exposed areas a copper plating resistant to chemical etchants, removing the masking and exposing the aluminum surface to a chemical etchant to remove unwanted portions therefrom, and removing the copper plating from the workpiece.

3. The method of masking an aluminum workpiece a surface of which is to be exposed to chemical attack to produce an integral structural member, said method comprising the steps of masking those areas of said surface to be subjected to attack with an electroplating resistant material, coating the remaining portion of the said workpiece surface in a zincate solution composed of caustic soda, zinc oxide and Rochelle salts, copper plating the said remaining portion of the workpiece in a Rochelle cyanide solution, removing the electroplating resistant material to lay bare the portion of said surface to be attacked, placing the workpiece in a chemically attacking environment to thereby immediately expose said bare portion to the action of said environment until the unwanted portions of the said workpiece surface portion have been removed and thereafter removing the copper plating from the workpiece while at the same time effecting the removal of the aluminum smut resulting from said chemical attack.

4. The method of masking an aluminum workpiece the surface of which is to be exposed to chemical attack to produce an integral structural member, said method comprising the steps of masking those areas of said surface to be subjected to attack with an electroplating resistant material, applying a zinc immersion coating to the remaining portion of the said workpiece surface, removing the resulting zinc coating with a nitric acid solution, applying a second zinc immersion coating to the said remaining portion of the workpiece surface and thereafter electroplating same with copper, removing the electroplating resistant material to lay bare the underlying area and subjecting the workpiece to immediate chemical attack by immersing the said bared area in an attacking chemical solution, and thereafter removing the copper plating from the aluminum while at the same time and by the same means desmutting the surface of the aluminum subjected to said solution attack.

5. The method of masking an aluminum workpiece to be exposed to chemical attack to produce an integral structural member, said method comprising the steps of masking those areas to be subjected to attack with an electroplating resistant material, coating the remaining portion of the workpiece in a zincate solution composed of caustic soda, zinc oxide and Rochelle salts, removing the resulting zinc coating with a nitric acid solution, recoating the remaining portion a second time with the same solution, electroplating the unmasked portion of the workpiece with copper in a Rochelle cyanide solution, removing the electroplating resistant material to expose the underlying surface area of the workpiece, placing the workpiece in a chemically attacking environment to thereby immediately expose said surface area to the eroding action thereof and thereafter both removing the copper plating from the workpiece and desmutting the aluminum at the same time with a nitric acid solution.

6. The method of masking an aluminum workpiece to be exposed to chemical attack to produce an integral structural member, said method comprising the steps of masking those areas to be subjected to attack with an electroplating resistant material, coating the remaining portion of the workpiece with a solution of approximately 70 oz./gal. caustic soda, approximately 13.4 oz./gal. zinc oxide and approximately 1.5 oz./gal. Rochelle salts, removing the resulting zinc coating with a 1 to 1 solution of nitric acid and recoating in the same solution of caustic soda, zinc oxide and Rochelle salts, electroplating the workpiece with copper to a maximum of 1 mil thickness in a Rochelle cyanide solution, removing the electroplating resistant material to lay bare the area therebeneath, placing the workpiece in an alkaline chemically attacking environment such that said bared area is immediately exposed thereto until unwanted portions of the said workpiece area have been removed, and thereafter removing the copper plating from the workpiece and de-smutting the aluminum, said plating removal being accomplished at the same time as said desmutting with a 1 to 1 nitric acid solution.

7. The method of masking an aluminum workpiece to be exposed to chemical attack to produce an integral structural member, said method comprising the steps of masking with an electroplating resistant material those areas to be subject to attack, electroplating the remaining un-masked areas with copper, removing the electroplating resistant material to expose the workpiece surface areas underlying same, thereupon subjecting the thus exposed areas to said attack to remove a pre-determined portion therefrom, and thereafter both removing the copper plating from the workpiece and de-smutting the aluminum at the same time with a nitric acid solution.

8. The method of claim 7, wherein there is applied to the said remaining unmasked areas of the workpiece prior to copper electroplating a zincate solution composed of caustic soda, zinc oxide and Rochelle salts.

References Cited in the file of this patent

UNITED STATES PATENTS

| | | |
|---|---|---|
| 1,974,011 | Bergess | Sept. 18, 1934 |
| 2,559,389 | Beeber et al. | July 3, 1951 |
| 2,584,317 | Aller | Feb. 5, 1952 |
| 2,650,886 | Zelley | Sept. 1, 1953 |
| 2,654,701 | Calderon et al. | Oct. 6, 1953 |
| 2,662,054 | Passel | Dec. 8, 1953 |
| 2,885,273 | Oelgoetz et al. | May 5, 1959 |
| 2,891,309 | Fenster | June 23, 1959 |
| 2,912,312 | Japel | Nov. 10, 1959 |
| 2,934,479 | Deer | Apr. 26, 1960 |

FOREIGN PATENTS

| | | |
|---|---|---|
| 813,803 | Great Britain | May 21, 1959 |